United States Patent [19]

Ogawa

[11] Patent Number: 4,855,789
[45] Date of Patent: Aug. 8, 1989

[54] IMAGE FORMING METHOD AND APPARATUS

[75] Inventor: Masami Ogawa, Tokyo, Japan

[73] Assignee: Canon Kabushiki Kaisha, Tokyo, Japan

[21] Appl. No.: 298,306

[22] Filed: Jan. 18, 1989

Related U.S. Application Data

[63] Continuation of Ser. No. 19,664, Feb. 27, 1987, abandoned.

[30] Foreign Application Priority Data

Mar. 13, 1986 [JP] Japan .................................. 61-53663

[51] Int. Cl.⁴ ...................... G03B 27/32; G03B 27/52
[52] U.S. Cl. ......................................... 355/26; 355/24; 353/26 R; 353/81
[58] Field of Search ............................ 355/24, 23, 26; 353/26 R, 81

[56] References Cited

U.S. PATENT DOCUMENTS

| | | | |
|---|---|---|---|
| 4,436,391 | 3/1984 | Kashiwagi | 353/26 |
| 4,607,948 | 8/1986 | Naito | 355/24 |
| 4,674,866 | 6/1987 | Tanaka | 355/23 |

Primary Examiner—Monroe H. Hayes
Attorney, Agent, or Firm—Fitzpatrick, Cella, Harper & Scinto

[57] ABSTRACT

A method and apparatus for forming images on both surfaces of a sheet. To form such images a first column of images placed at the exposure position on an image bearing member on which images are arranged in at least two columns is recorded on one surface of the sheet, whereafter a second column of images on the image bearing member is moved to the exposure position. The second column of images placed at the exposure position is recorded on the other surface of the sheet. The image bearing member is moved in a direction parallel to the direction of arrangement of the images to dispose the next images to be recorded at the exposure position after the images have been recorded on both surfaces of the sheet.

13 Claims, 4 Drawing Sheets

IMAGE FORMING METHOD AND APPARATUS

This application is a continuation of application Ser. No. 019,664 filed Feb. 27, 1987, now abandoned.

BACKGROUND OF THE INVENTION

1. Field of the Invention

This invention relates to a method and an apparatus for forming images on an image bearing member on both surfaces of a sheet.

2. Related Background Art

A film as shown in FIG. 5 of the accompanying drawings has heretofore been available as a film used with an apparatus such as a microfilm reader-printer. On this film 4, image frames 3 are recorded in two rows and retrieval marks m are provided on one side edge of the image frames 3. The photographing system for such film 4 is called duplex, which involves a method whereby the images on the front surface of an original are photographed on one side edge portion of the film 4 in succession from the leading end thereof and at the same time the images on the back surface of the original are photographed on the remaining side edge portion of the film. In the example shown, for convenience, the image frames 3 are given numbers in succession from the leading end of the film.

To copy the images of the image frames 3 of the film 4, the image frames 3 on one side edge portion of the film 4 have been successively copied on one surface of copying paper, whereafter the film has been rewound to the leading image frame 3, and then the image frames on the remaining side edge portion have likewise been successively copied on one surface of copying paper.

In the case of such prior art, however, even if a plurality of rows of image frames 3 are photographed on the film 4, all the image frames 3 of the film 4 are copied only one surface of a sheet of copying paper and therefore, the same number of sheets of copying paper as the number of images to be copied is required, and for an information recording medium such as microfilm which is capable of recording a great deal of originals thereon, the consumption of copying paper becomes enormous. Further, and there has also been the problem that associated image frames 3 are copied on different sheets of copying paper and the handling of the copying paper is cumbersome.

SUMMARY OF THE INVENTION

It is an object of the present invention to solve the above-noted problems peculiar to the prior art and to reduce the consumption of copying paper.

It is another object of the present invention to copy the associated images on an image bearing member on both surfaces of copying paper to thereby facilitate the handling of the copying paper.

DESCRIPTION OF THE PREFERRED EMBODIMENT

Figure 1:
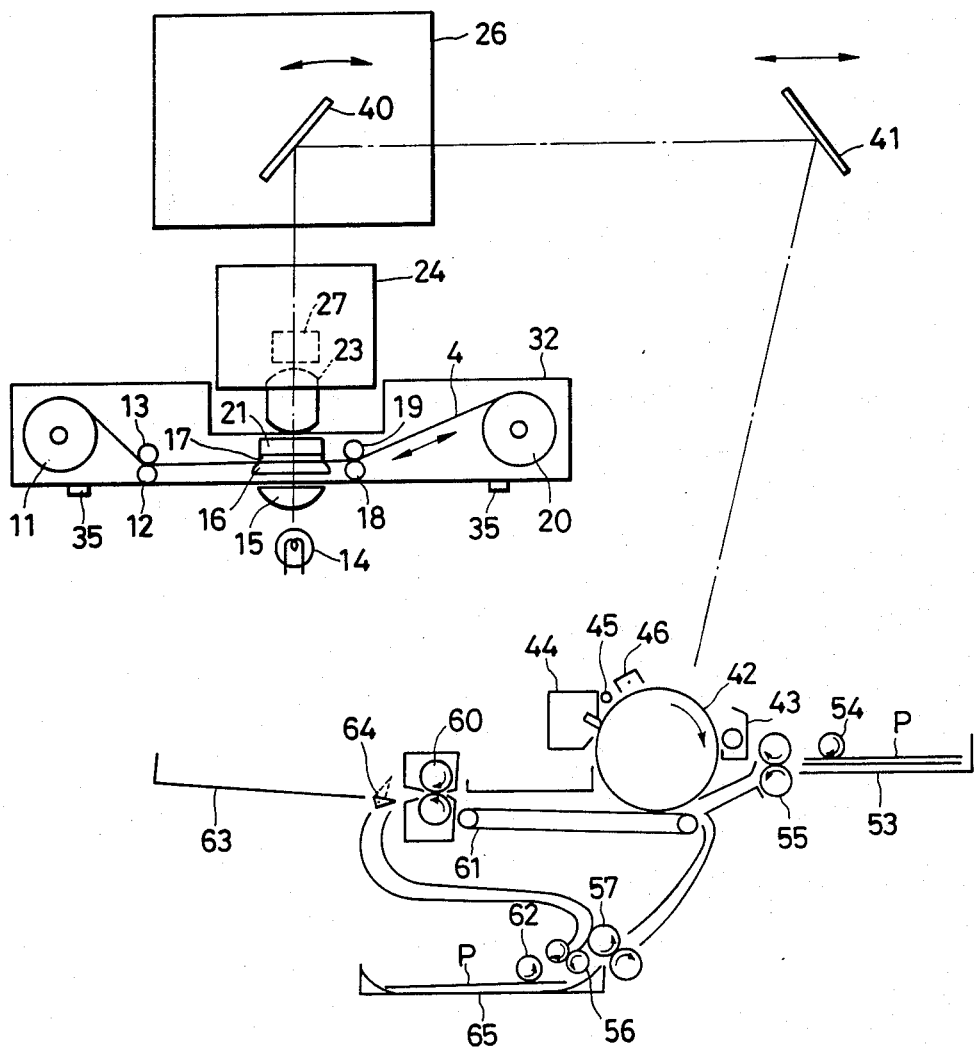
FIG. 1 is a schematic front view of a microfilm reader-printer to which an image forming apparatus according to the present invention is applied.

The invention will hereinafter be described with respect to an embodiment thereof shown in the drawings.

Figure 2:
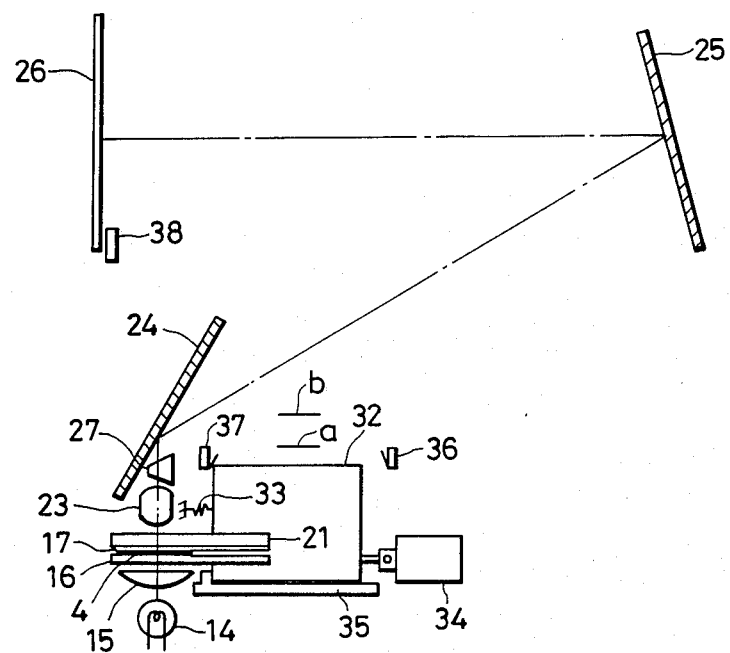
FIG. 2 is a side view of the essential portions of FIG. 1.
Figure 5:
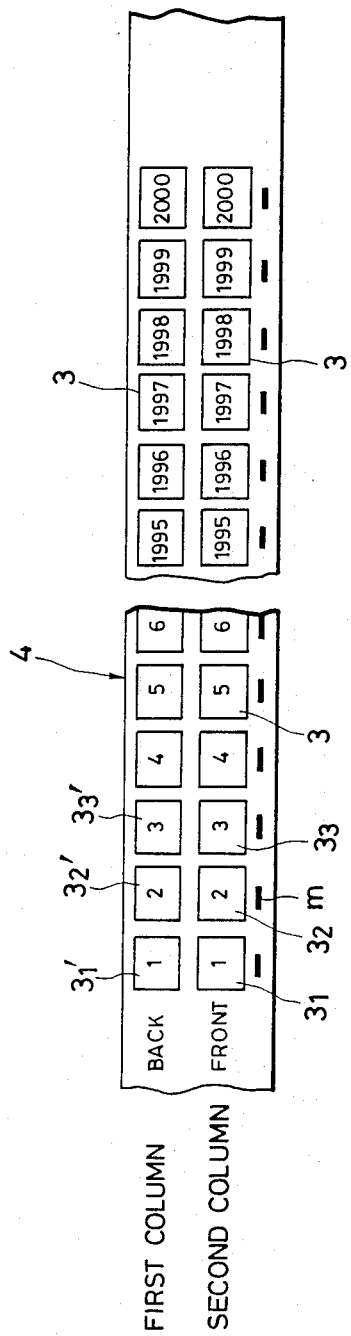
FIG. 5 is a plan view of microfilm.

FIGS. 1 and 2 show a microfilm reader-printer with a retrieving apparatus to which the present invention is applied. Reference numeral 11 designates a supply reel, reference numerals 12 and 13 denote film guide rollers, reference numeral 14 designates a lamp for illuminating a microfilm 4 shown in FIG. 5, reference numeral 15 denotes a condenser lens, reference numerals 16 and 17 designate transparent glass plates disposed in opposed relationship with each other with a film movement path interposed therebetween, reference numeral 18 denotes a capstan roller, reference numeral 19 designates a pinch roller, and reference numeral 20 denotes a take-up roller. The supply reel 11 and the take-up reel 20 are connected to a film tensioning and taking-up motor, and the capstan roller 18 is connected to a film feeding motor (the torque of which is greater than the torque of the film tensioning and taking-up motor).

The microfilm 4 is extended between the supply reel 11 and the take-up reel 20 and may be taken up onto the take-up reel or rewound onto the supply reel by forward or reverse rotation of the capstan roller 18.

Reference numeral 23 designates a projection lens, reference numeral 24 denotes a first reflecting mirror for changing over the optical path, reference numeral 25 designates a second reflecting mirror, and reference numeral 26 denotes a screen. The projection lens 23, the mirrors 24 and 25 and the screen 26 are disposed at predetermined positions. The microfilm 4 is illuminated by the lamp 14 with the images in one selected column thereof placed at the exposure station, and light rays transmitted through the microfilm 4 pass through the lens 23 and are reflected by the reflecting mirrors 24 and 25 and travel toward the screen 26. The image on the illuminated film is enlarged and projected onto the screen 26. Reference numeral 27 designates a trapezoidal prism for optically rotating the image projected by the lens 23 about an axis parallel to the optic axis. If the image frames on the microfilm are inclined with respect to their regular direction, the prism 27 may be rotated to thereby correct the direction of the projected image.

Reference numeral 32 denotes a holding pedestal on which are held the supply reel 11, the guide rollers 12, 13, the glass plates 16, 17, the capstan roller 18, the pinch roller 19, the take-up reel 20, etc. The holding pedestal 32 is connected to a coil spring 33 and a solenoid 34 and may be moved in the direction of arrow b along a rail 35 when the solenoid 34 is energized, and may be moved to its original position in the direction of arrow a by the action of the coil spring 33 when the solenoid 34 is deenergized. Accordingly, the film 4 may be moved with the holding pedestal 32 in a direction perpendicular to the film feed direction, and when the solenoid 34 is energized, the images in a first column of the film are placed in the optical path of the lens 23, i.e., in the exposure station, and when the solenoid 34 is de-energized, the images in a second column of the film are placed in the optical path of the lens 23, and thus the images in the selected column of the film are positioned in the projection optical path by turning solenoid 34 on and off.

Alternatively, the holding pedestal 32 may be moved by a motor.

Reference numerals 36 and 37 designate column detectors for detecting the columns of the images placed in the optical path of the len 23. The detectors 36 and 37 each comprise a microswitch which is switched on or off in conformity with the position of the holding pedestal 32. When the images in the first column of the microfilm 4 are placed in the optical path, the first column detector 36 detects the holding pedestal 32 and outputs a first column detector signal of a high level, and when the images in the second column of the microfilm are placed in the optical path, the second column detector 37 detects the holding pedestal 32 and outputs a second column detector signal of a high level.

Designated by 38 is a mark detector comprising a light-receiving element. The mark detector 38 is for detecting retrieval marks m on the microfilm 4. The marks detected by this mark detector 38 are counted by a CPU circuit 52 which will be described later, and the microfilm 4 is fed to a desired address.

Reference numeral 42 designates an electrophotographic photosensitive drum, reference numeral 43 denotes a developing device for developing an electrostatic latent image formed on the photosensitive drum 42 with the aid of toner, reference numeral 44 designates a cleaning device for removing the toner on the photosensitive drum, reference numeral 45 denotes a lamp, and reference numeral 46 designates a charger. The photosensitive drum 42 is rotated in the direction of arrow at a predetermined speed by a drive source, not shown, during copying.

Reference numerals 40 and 41 denote reflecting mirrors for forming an image projection optical path to the photosensitive drum 42. The reflecting mirrors 40 and 41 are moved as a unit in the directions of the arrows at a predetermined speed during copying. During the reader mode in which the image is projected onto the screen, the first reflecting mirror 24 is placed in the optical path of the projection lens 23. On the other hand, during the copy mode in which the image is projected onto the photosensitive drum, the first reflecting mirror 24 is retracted out of the optical path of the projection lens 23.

When the first reflecting mirror 24 is retracted out of the optical path, the reflecting mirror 40 is brought into the optical path of the projection lens 23 and an image projection optical path to the photosensitive drum 42 is formed by the reflecting mirrors 40 and 41. In this state, the reflecting mirrors 40 and 41 are moved in synchronism with the rotation of the photosensitive drum and the image is projected onto the photosensitive drum.

Reference numeral 53 designates a paper tray containing copying paper P therein, reference numeral 54 denotes a paper feed roller for feeding out the copying paper P, reference numerals 55, 56 and 57 designate feed rollers, reference numeral 60 denotes fixing rollers, reference numeral 61 designates a conveyor belt, reference numeral 62 denotes a paper feed roller, and reference numeral 63 designates a paper discharge tray.

The copying paper P fed out from the paper tray 53 by the paper feed roller 54 is fed to the fixing rollers 60 of the fixing device by the feed rollers 55 and the conveyor belt 61.

Designated by 64 is a paper path changing-over pawl pivotable to a solid-line position and a broken-line position. When the pawl 64 is in the solid-line position, it conveys the copying paper P discharged from the fixing rollers 60 to the paper discharge tray 63, and when the pawl 64 is in the broken-line position, it conveys the copying paper P discharged from the fixing rollers 60 toward the feed rollers 56 to effect both-side copying. Reference numeral 65 denotes an intermediate tray. The copying paper P fed to the feed rollers 56 is conveyed to the intermediate tray 65, whereafter it is again conveyed to the transfer station of the photosensitive drum 42 by the paper feed roller 62 and the feed rollers 57, and copying on a second surface of the copying paper P is effected.

To copy an image on the copying paper, the image of the image frame 3 in the first column on the illuminated microfilm 4 is projected onto the photosensitive drum 42 through the intermediary of the lens 23 and the reflecting mirrors 40 and 41. In synchronism with the rotation of the photosensitive drum 42, the copying paper P is fed from the paper tray 53 by the paper feed roller 54 and the feed rollers 55, and a visible image formed on the photosensitive drum 42 is transferred to the front surface of the copying paper P. The copying paper P having the visible image transferred thereto has the image thereon fixed by the fixing rollers 60, whereafter it is received onto the intermediate tray 65 by the change-over of the paper path changing-over pawl 64. Subsequently, the image frame 3 in the second column to be copied on the back surface of the copying paper P is selected, whereafter this image is projected onto the photosensitive drum 42 and the copying paper P is fed from the intermediate tray 65, and a visible image is transferred to the back surface of the copying paper P, whereafter the image is fixed by the fixing rollers 60. The copying paper P having the images thus copied on the both surfaces thereof is discharged onto the paper discharge tray 63 by the change-over of the paper path change-over pawl 64.

Figure 3:
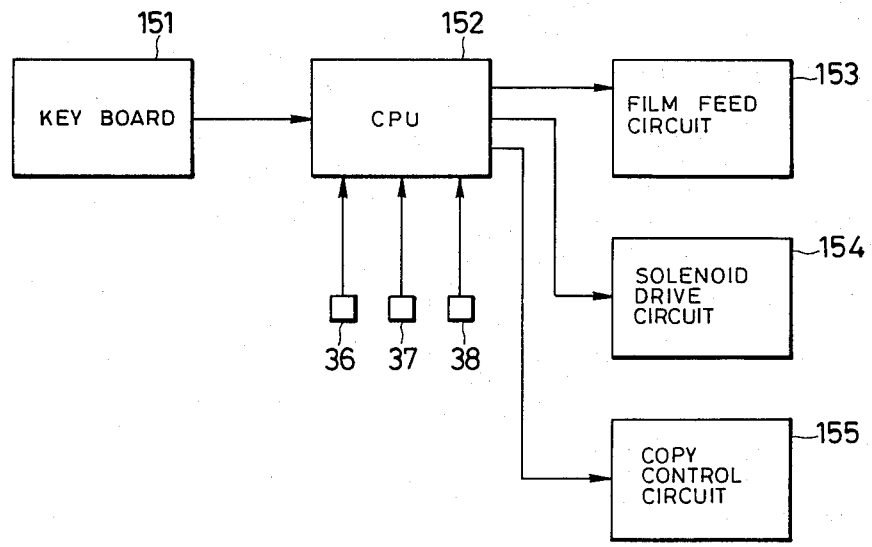
FIG. 3 is a block diagram showing a control system of the present invention.

FIG. 3 is a block diagram showing a control system. Reference numeral 151 designates a keyboard for inputting various operation commands, reference numeral 152 denotes a CPU circuit, reference numerals 36 and 37 designate the aforementioned column detectors, reference numeral 38 denotes the aforementioned mark detector, reference numeral 153 designates a film feed circuit for controlling the feeding of the film, reference numeral 154 denotes a solenoid drive circuit for driving the solenoid 34, and reference numeral 155 designates a copy control circuit for controlling the copying mechanism.

Figure 4:
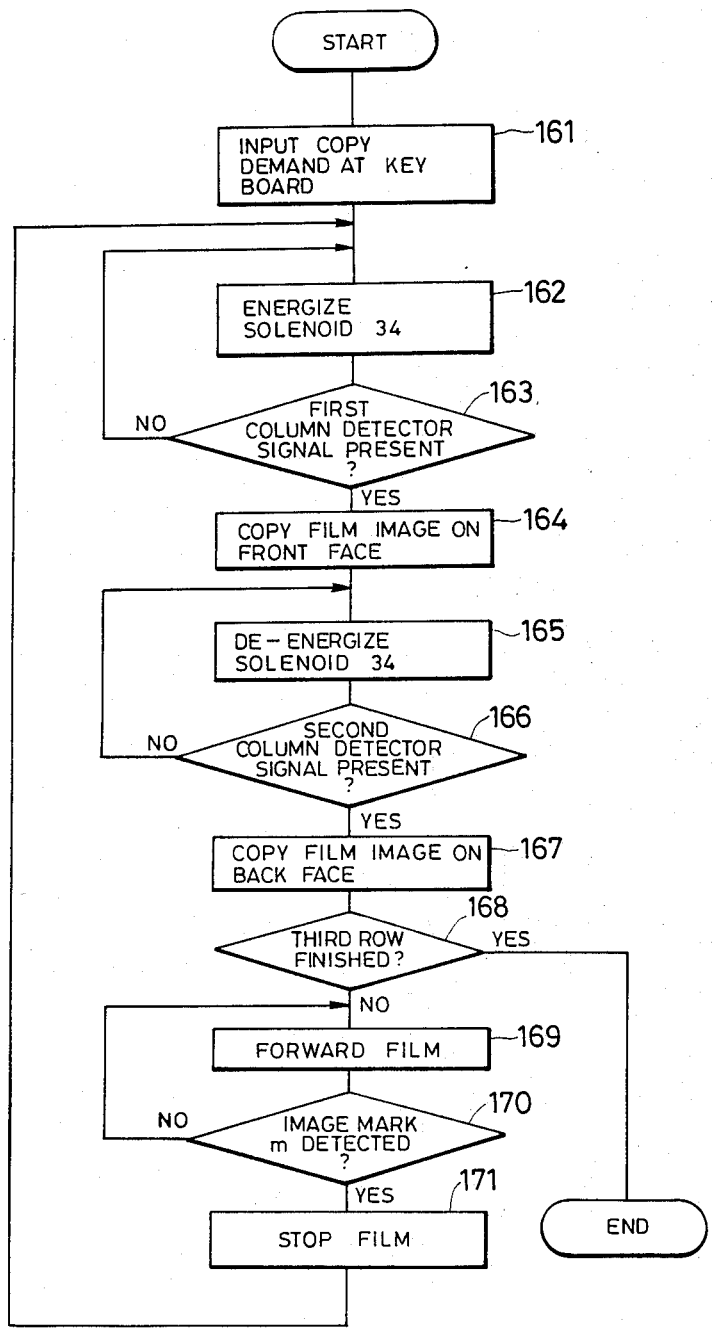
FIG. 4 is a flow chart showing the operation of the control system.

In the above-described construction, the copying method according to the present embodiment will now be described by reference to FIGS. 3 and 4 with respect to a case where six image frames 31, $3_1'$, $3_2$, $3_2'$, $3_3$ and $3_3'$ from the first to third frames on the microfilm 4 are copied on the both surfaces of three sheets of copying paper P. The user inputs from the keyboard 151 a command for copying the group of images of the first to third frames on the both surfaces of there sheets of copying paper P (161). The CPU circuit 152 discriminates this, and starts the following operations.

The CPU circuit 152 first gives a command to the solenoid drive circuit 154 to energize the solenoid 34 (162), and move the holding pedestal 32 to a position in which the image frame $3_1$ in the first column of the first frame of the microfilm 4 enters an area that can be copied. After the signal from the first column detector 36 has been input (163), the CPU circuit 152 operates the copy control circuit 155 to copy the image $3_1$ in the first column of the first frame on the front surface of the copying paper P(164). Subsequently, the CPU circuit 152 gives a command to the solenoid drive circuit 154 to de-energize the solenoid 34 (165) and move the holding pedestal 32 to a position in which the image frame $3_1'$ in the second column of the first frame of the microfilm 4 enters the area that can be copied. After the signal from the second column detector 37 has been input, the CPU circuit 152 operates the copy control circuit 155 to copy the image $3_1'$ of the second column of the first frame on the back surface of the copy paper P on the front surface of which the image has already been copied (167). After the two images $3_1$ and $3_1'$ of the first frame have been copied, the CPU circuit 152 operates the film feed circuit 153 (169) to detect a retrieval mark m by the mark detector 38, to feed the microfilm 4 to the image frame 32 of the second frame (170) and to stop the microfilm 4.

Thereafter, similar sequences 162–171 are repeated, whereby the image frame $3_3'$ up to the third frame is copied, whereafter the copying operation is completed.

Although the embodiment illustrated has been described with respect to a case where the microfilm 4 has two columns of image frames 3, the present invention is of course applicable also to a case where the microfilm 4 has three or more columns, and in such case, at least two of the three or more image frames may be copied on the both surfaces of the same copying paper. The image bearing member is not restricted to a microfilm, but may also be a document, a long sheet original or the like.

As described above, an image bearing member having at least two columns of images is moved in a direction orthogonal to the feeding direction so that at least two images positioned in the same direction are copied on the front and back surfaces of copying paper and therefore, the amount of consumption of copying paper on only one surface of which copying has heretofore been effected can be decreased. Also, at least two images positioned in the direction orthogonal to the feeding direction which are often associated with each other can be copied on a sheet of copying paper and therefore, the handling of copying paper on which the images of an image bearing member of large capacity such as a microfilm have been copied becomes simple.

I claim:

1. An image recording apparatus for recording images from an elongated recording medium on which a plurality of images are arranged in both the lateral and longitudinal directions thereof, wherein the apparatus comprises:

a first moving means for moving the elongated recording medium in its longitudinal direction;

a second moving means for moving the recording medium in its lateral direction;

recording means for recording on sheets the images moved to a predetermined position; and a first control means for controlling said first and second moving means to move the recording medium in its longitudinal direction to place a first image at the predetermined position, and then to move the recording medium in its lateral direction to place a second image at the predetermined position, the second image being arranged in the lateral direction of the recording medium in relation to the first image, and then to move the recording medium in its longitudinal direction and its lateral direction to place a third image at the predetermined position, the third image being arranged in the longitudinal direction of the recording medium in relation to the first image; and a second control means for controlling the recording means to record on a first surface of the sheet the first image placed at the predetermined position, and then to record on a second surface of the sheet the second image placed at the predetermined position, and then to record on a first surface of a second sheet the third image placed at the predetermined position.

2. An apparatus according to claim 1, further comprising:

detecting means for detecting marks provided at the side of the images on the recording medium; and means for stopping said first moving means from moving the elongated recording medium in response to an output signal from the detecting means.

3. An apparatus according to claim 1, wherein said first moving means includes feeding means for feeding the images on the recording medium to the predetermined position.

4. An apparatus according to claim 1, wherein said second moving means includes support means for supporting the recording medium and said first moving means, and means for driving said support means.

5. An apparatus according to claim 4, further comprising:

means for detecting the position of said support means; and means for stopping said drive means from driving said support means in response to an output from said detecting means for detecting the position of said support means.

6. An apparatus according to claim 1, further comprising:

optical means for projecting the images on the recording medium to a recording position of said recording means; and means for correcting the direction of the projected image.

7. An apparatus according to claim 6, wherein said correcting means includes a rotatable prism disposed in an optical path of said optical means.

8. An apparatus according to claim 1, wherein said recording means comprises:

a photosensitive member;

developing means for developing a latent image formed on said photosensitive member to form a visible image on said photosensitive member; and transfer means for transferring said visible image formed on said photosensitive member to a sheet.

9. An apparatus according to claim 1, further comprising means for setting an image to be recorded from the longitudinally arranged images on the recording medium.

10. A film projecting apparatus comprising:

optical means for projecting to a reading position an image selected from a plurality of images recorded on an elongated film when the selected image is placed at a predetermined position, said plurality of images comprising images arranged in first and second rows in the longitudinal direction of the elongated film;

recording means for recording on sheets images placed at the predetermined position;

first moving means for moving the film in its longitudinal direction;

second moving means for moving the film in its lateral direction;

a first control means for controlling said first and second moving means to move the film in its longitudinal direction to place a first image at the predetermined position, the first image being selected from the images arranged in said first row, and then to move said film in its lateral direction to place a second image at the predetermined position, the second image being arranged in said second row and in line with said first image in the lateral direction of the film, and then to move the film in its longitudinal direction and its lateral direction to place a third image at the predetermined position, the third image being arranged in said first row and in line with said first image in the longitudinal direction of the film, and then to repeat the aforementioned operation wherein the image of said first row is placed at the predetermined position and then the image of said second row is placed at the predetermined position until all of the images to be recorded are sequentially placed at the predetermined position;

a second control means for controlling said recording means to alternatively, one-by-one, record the images which are arranged in said first and second rows and are placed at the predetermined position.

11. An apparatus according to claim 10, wherein said first moving means includes feeding means for feeding the film in its longitudinal direction and means for stopping the feeding of the film when a mark provided to the side of each longitudinally arranged image is detected.

12. An apparatus according to claim 10, further comprising means for setting an image from among the longitudinally arranged images to be moved to the predetermined position.

13. A film projecting apparatus comprising:

an optical means for projecting to a reading position images recorded on an elongated film in a manner such that images of first surfaces of plural original documents are arranged in a first row and images of second surfaces of said plural original documents are arranged in a second row;

recording means for recording on the sheets the images projected by said optical means;

first moving means for moving the film in its longitudinal direction;

second moving means for moving the film in its lateral direction;

designating means for designating the images to be recorded from the plurality of images on the film;

first control means for controlling said first and second moving means in accordance with the designation made by said designating means to move the film in its longitudinal direction to place a first image of said first row at a predetermined position, and then to move the film in its lateral direction to place a second image at the predetermined position, the second image being arranged in said second row and in line with said first image in the lateral direction of the film, and then to move the film in its longitudinal direction and its lateral direction to place a third image at the predetermined position, the third image being arranged in said first row and in line with said first image in the longitudinal direction of the film, and then to repeat the aforementioned operation wherein the designated images of said first and second rows are, one-by-one, placed at said predetermined position until all of images designated by said designating means are sequentially placed at said predetermined position; and a second control means for controlling said recording means to alternately, one-by-one, record the images which are arranged in said first and second rows and are placed at said predetermined position.

* * * * *